United States Patent [19]
Oono et al.

[11] Patent Number: 5,341,246
[45] Date of Patent: Aug. 23, 1994

[54] APPARATUS FOR ADJUSTING AN OPTICAL AXIS INCLUDING PLATES ON OPPOSITE SIDES OF A BEAM SHAPING PRISM

[75] Inventors: Masahiro Oono; Koichi Maruyama; Makoto Iki; Hitoshi Kimura; Masahiko Sasaki, all of Tokyo, Japan

[73] Assignee: Asahi Kogaku Kogyo Kabushiki Kaisha, Tokyo, Japan

[21] Appl. No.: 53,688

[22] Filed: Apr. 29, 1993

Related U.S. Application Data

[62] Division of Ser. No. 770,342, Oct. 3, 1991, Pat. No. 5,237,457.

[30] Foreign Application Priority Data

| Oct. 4, 1990 | [JP] | Japan | 2-104707 |
| Oct. 4, 1990 | [JP] | Japan | 2-104708 |
| Oct. 4, 1990 | [JP] | Japan | 2-104709 |

[51] Int. Cl.$^5$ .............................. G02B 5/04; G02B 7/18
[52] U.S. Cl. .................................. 359/837; 359/831; 359/209; 359/211; 359/669; 359/737
[58] Field of Search ............... 359/209, 211, 557, 737, 359/589, 669, 837, 831; 369/110

[56] References Cited

U.S. PATENT DOCUMENTS

| 4,016,504 | 4/1977 | Klauminzer . |
| 4,034,949 | 7/1977 | Hoesterey et al. . |
| 4,059,343 | 11/1977 | Kowalski et al. . |
| 4,118,109 | 10/1978 | Crawford et al. . |
| 4,319,807 | 3/1982 | Horton . |
| 4,514,447 | 5/1985 | Weimer et al. ............ 359/211 |
| 4,623,225 | 11/1986 | Forkner . |
| 4,768,184 | 8/1988 | Reno . |
| 4,819,096 | 4/1989 | Grant et al. . |
| 4,822,974 | 4/1989 | Leighton . |
| 4,850,686 | 7/1989 | Morimoto et al. . |
| 4,948,233 | 8/1990 | Maruyama . |
| 4,997,250 | 3/1991 | Ortiz, Jr. . |
| 5,016,237 | 5/1991 | Nakamura et al. ........ 359/669 |
| 5,032,014 | 7/1991 | Toga ........................ 359/737 |
| 5,084,783 | 1/1992 | Dewey et al. . |
| 5,155,633 | 10/1992 | Grove et al. . |

FOREIGN PATENT DOCUMENTS

| 141366 | 4/1980 | Germany ................. 359/737 |
| 63-140426 | 6/1988 | Japan . |
| 63-157817 | 10/1988 | Japan . |

Primary Examiner—Jon W. Henry
Attorney, Agent, or Firm—Sandler Greenblum & Bernstein

[57] ABSTRACT

An optical axis adjusting apparatus is provided and includes a laser beam source, a beam shaping prism for shaping a laser beam of elliptical flux emitted from the laser beam source into a laser beam of circular flux, a parallel shift mechanism which shifts the light rays of the laser beam in a parallel fashion, and a rotation adjusting mechanism for rotatably adjusting a parallel plate.

11 Claims, 11 Drawing Sheets

APPARATUS FOR ADJUSTING AN OPTICAL AXIS INCLUDING PLATES ON OPPOSITE SIDES OF A BEAM SHAPING PRISM

This is a division of application Ser. No. 07/770,342, filed Oct. 3, 1991, now U.S. Pat. No. 5,237,457.

FIELD OF THE INVENTION

The present invention relates to an apparatus for adjusting the optical axis (direction) of a laser bear.

DESCRIPTION OF RELATED ART

For instance, in a optical disc apparatus a laser beam is converged onto a optical disc through an objective lens, and then, light reflected by the optical disc is transmitted through the objective lens and is split into signal light and servo control light by a beam splitter. In such an optical disc apparatus, to reproduce a high quality beam of light, it is necessary to precisely converge the laser beam onto the optical disc. To this end, the laser beam must be made exactly incident upon the optical axis of the objective lens. However, since the objective lens is provided on a carriage which moves in the radial direction of an optical disc, it is necessary to make the direction of the laser beam precisely parallel with the direction of the movement of the carriage in order to make the laser beam incident upon the optical axis of the objective lens regardless of the position of the carriage. Namely, it is necessary to adjust the direction and deviation of the laser beam with respect to the direction of the movement of the carriage. However, the adjustment is complex and time consuming.

SUMMARY OF THE INVENTION

The primary object of the present invention is to provide a simple adjusting apparatus of an optical axis in which the adjustment can be easily effected.

Another object of the present invention is to provide an adjusting apparatus of an optical axis in which a quick adjustment can be carried out.

To achieve the objects mentioned above, according to the present invention, there is provided an optical axis adjusting apparatus comprising a laser beam source, beam shaping means for shaping a laser beam of elliptical flux emitted from the laser beam source into a laser beam of circular flux, and angle adjusting means for adjusting the angular direction of the outgoing laser beam emitted from the beam shaping means.

According to another aspect of the present invention, an optical axis adjusting apparatus comprises a beam shaping prism having an incident surface and an emission surface which together form a predetermined apex angle, and rotation adjusting means for adjusting the rotation of the beam shaping prism about the optical axis of the outgoing laser beam.

According to still another aspect of the present invention, there is provided an optical axis adjusting apparatus comprising a beam shaping prism having an incident surface and an emission surface which together form a predetermined apex angle, a support to which the beam shaping prism is secured, a movable substrate capable of moving with respect to the support and having a laser beam source provided thereon which emits a laser beam toward an incident surface of the beam shaping prism, and a rotation adjusting means for adjusting the rotation of the movable substrate about an axis passing through the incident surface of the beam shaping prism.

According to still another aspect of the present invention, an optical axis adjusting apparatus comprising a beam shaping prism having an incident surface and an emission surface which forms a predetermined apex angle together with the incident surface, and a parallel shift mechanism which is provided on at least one of the incident and emission sides of the beam shaping prism to move the light rays in a parallel fashion.

The present disclosure relates to subject matter contained Japanese utility model applications in No.02-104707, No.02-104708 and No. 02-104709, (all being filed on Oct. 4, 1990) which are expressly incorporated herein by reference in its entirety.

BRIEF DESCRIPTION OF THE DRAWINGS

The invention will be described below in detail with reference to the accompanying drawings, in which:

FIG. 15b is a side elevational view of FIG. 15a; and,

DESCRIPTION OF THE PREFERRED EMBODIMENTS

Figure 16:
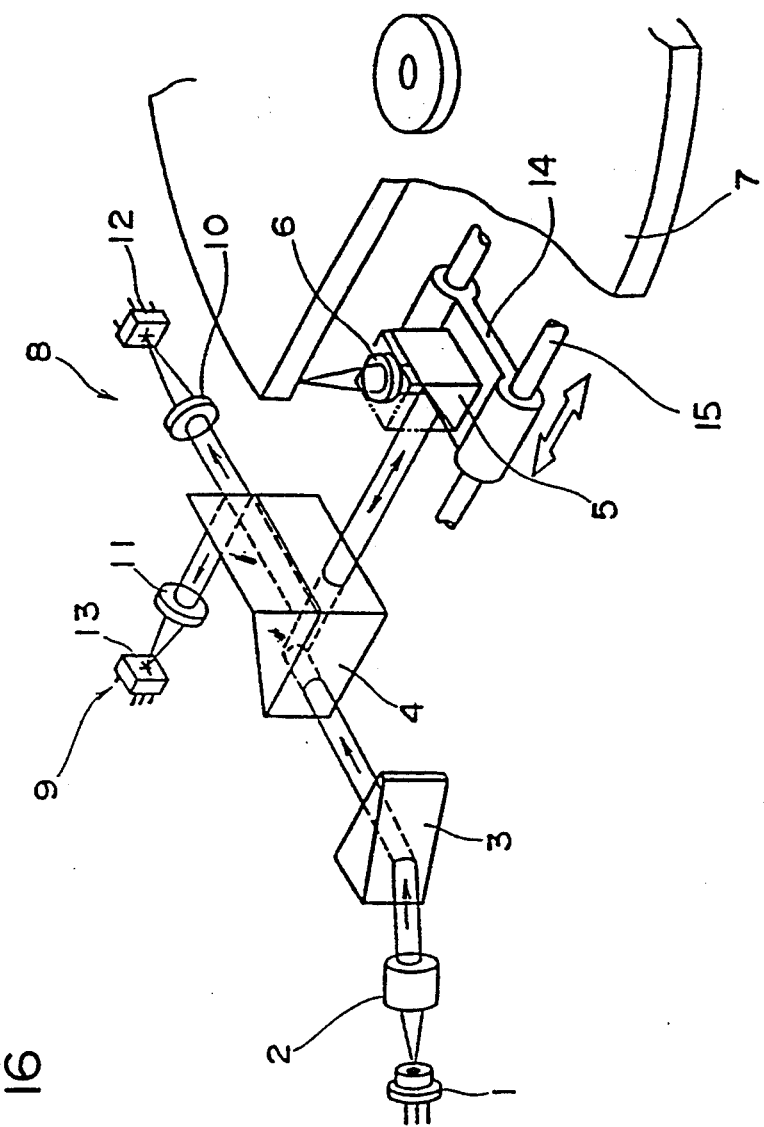
FIG. 16 is a schematic perspective view of an optical disc apparatus to which the present invention is applied.

In FIG. 16 which shows a laser disc apparatus to which the present invention is applied by way of example, light rays emitted from a laser beam source 1, such as a semiconductor laser, etc. are collimated by a collimating lens 2 and are then shaped into a circular flux of beams by a beam shaping prism 3. Thereafter, the beam is emitted through a beam splitter 4 and reflected by a mirror 5 to be made incident upon the objective lens 6 so that the beam is focused on the optical disc 7. The beam shaping prism 3 has a vertical incident surface and a vertical emitting surface. Consequently, a laser beam of elliptical shape having a major axis extending in the vertical direction is shaped into a circular beam by the beam shaping prism 3 in which the laser beam is elongated in the horizontal direction to be circular.

The circular laser beam reflected by the optical disc 7 is reflected by the mirror 5 and made incident upon the beam splitter 4 to be split thereby. The split beam is made partially incident upon an optical signal reproducing optical system 8 and made partially incident upon a servo control optical system 9 for controlling the tracking and focusing. The optical systems 8 and 9 include condenser lenses 10 and 11, and sensors 12 and 13.

The mirror 5 and the objective lens 6 are provided on a carriage 14. The carriage 14 is movable in the radial direction of the optical disc 7 along guide rails (rods) 15 to make the laser beam incident upon the desired track of the optical disc 7.

In the laser disc apparatus as constructed above, to make the laser beam precisely incident upon the optical disc 7, it is necessary to make the optical axis of the laser beam coincident with the optical axis of the objective lens 6. In particular, in the above mentioned optical arrangement in which the carriage 14 is movable on and along the guide rails 15, to make the optical axes of the laser beam and the objective lens 6 coincidental with each other, it is necessary to make the laser beam which is emitted from the beam splitter 4 and the mirror 5 toward the objective lens 6, parallel with the guide rails 15 (parallel adjustment), and if necessary, move the light rays of the laser beam in a parallel fashion until the optical axis of the laser beam is made coincident with the optical axis of the objective lens 6 (deviation adjustment).

The subject of the present invention is directed to an optical axis adjusting apparatus for the parallel adjustment and the deviation adjustment, mentioned above.

FIGS. 1 through 5 show a first embodiment of the present invention, in which the beam shaping prism 3 which shapes the elliptical laser flux into a circular laser flux has an incident surface 3a and an emission surface 3b which defines a predetermined angle $\alpha$ (FIG. 2) and is secured to an end surface of a circular cylindrical adjusting element (adjusting cylinder) 21 through which the laser beam can be transmitted. The adjusting cylinder 21 is provided on a support 22 which has a supporting surface projecting upwards at a right angle. The adjusting cylinder 21 is immovably held on the support 22 by a securing plate 23 which is bent into a quadrant. The securing plate 23 is secured at the ends thereof to the support 22 by set screws 24. When the adjusting cylinder 21 is held between the support 22 and the securing plate 23, the direction of rotation and the axial position of the adjusting cylinder 21 are fixed.

Figure 1:
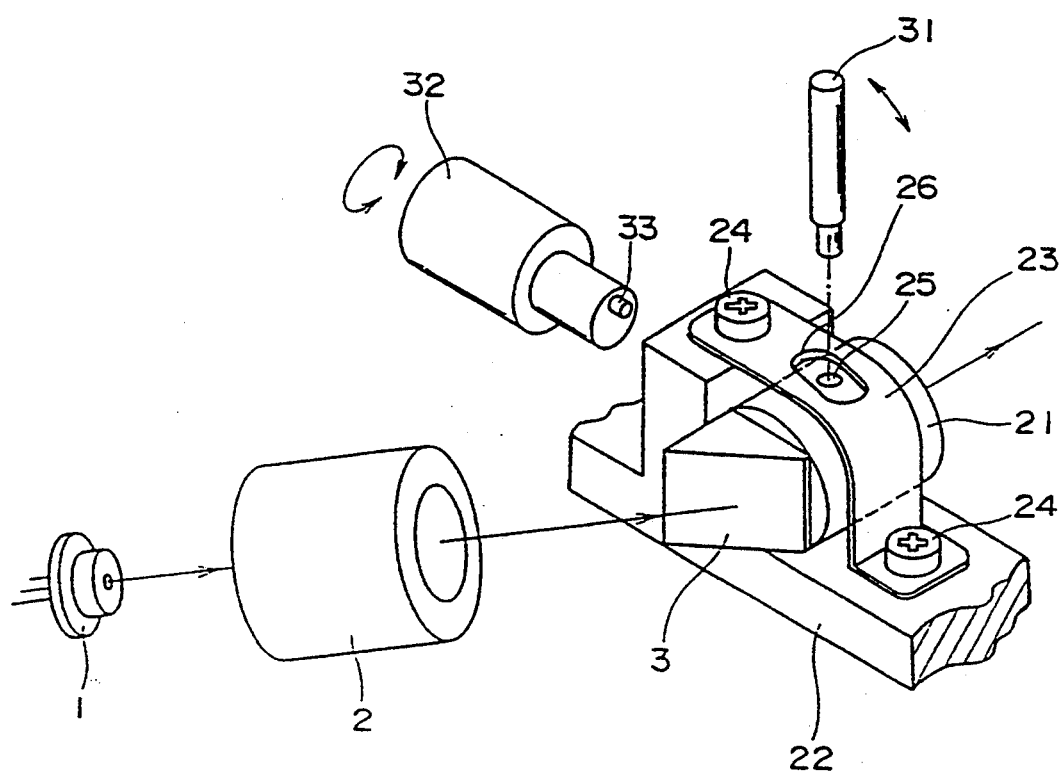
FIG. 1 is a perspective view of an optical axis adjusting apparatus according to a first embodiment of the present invention.
Figure 2:
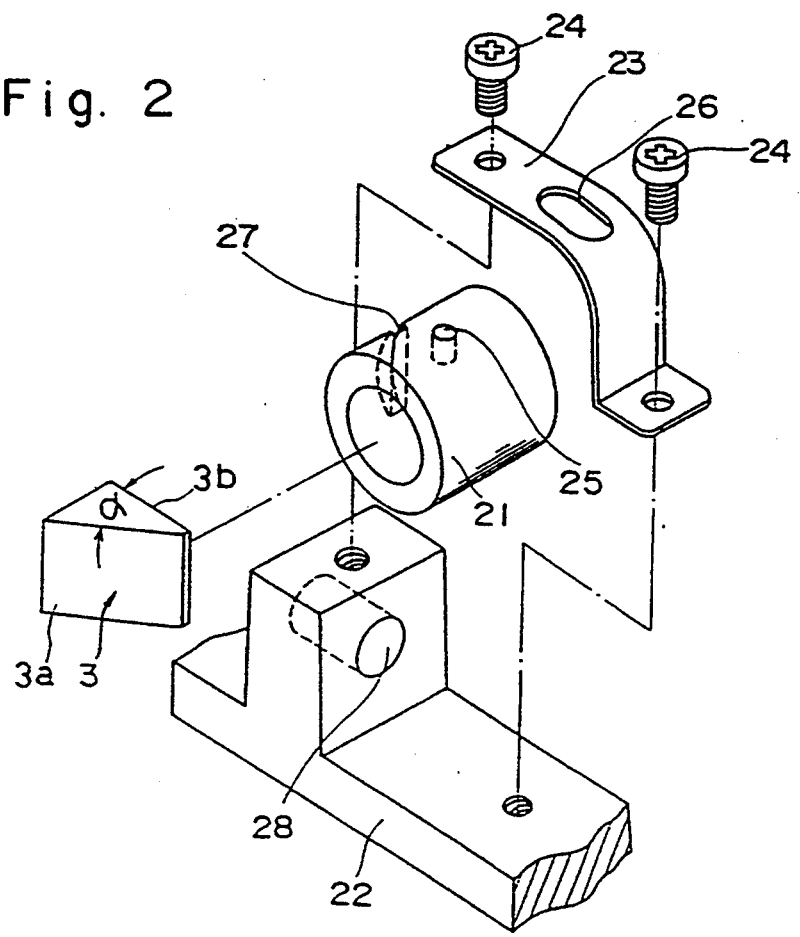
FIG. 2 is an exploded perspective view of the main components of an optical axis adjusting apparatus shown in FIG. 1.
Figure 3:
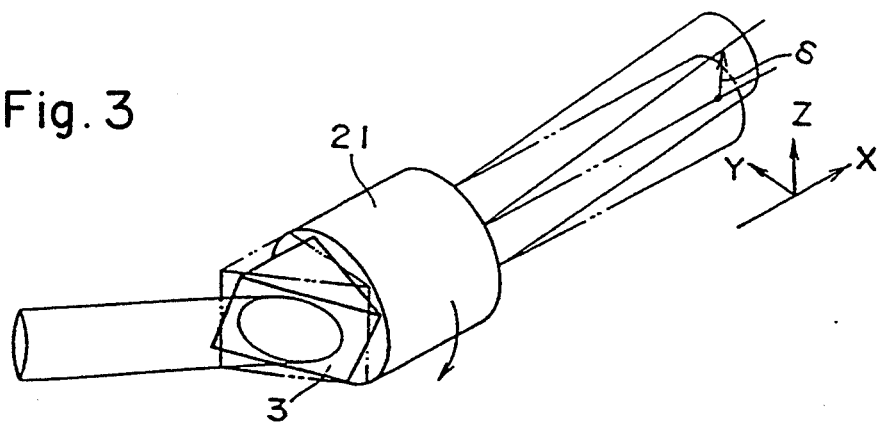
FIG. 3 is a schematic perspective view of a beam shaping prism which is rotated to adjust the laser optical axis in the adjusting apparatus shown in FIG. 1.

The adjusting cylinder 21 is provided on its upper peripheral surface with a rotation adjusting hole 25 which is exposed inside an elongated opening 26 formed in the securing plate 23. The side of the adjusting cylinder 21 is provided with a vertical recess 27 which is orthogonal to the axis of the adjusting cylinder 21 (FIG. 2). The vertical recess 27 is located on the portion of the adjusting cylinder in contact with the supporting surface of the support 22. The recess 27 is opposed to a large diameter hole 28 formed in the side face of the support 22 when the adjusting cylinder 21 is located on the support 22.

The beam shaping prism 3 is located so that the incident surface 3a and the emission surface 3b are perpendicular to the plane of the support 22. Consequently, the incident laser beam from the laser beam source 1 through the collimating lens 2 is refracted by the beam shaping prism 3 deforming the elliptical flux of the laser beam into a circular flux. The refracted circular beam is emitted from the emission surface 3b of the beam shaping prism 3 and transmitted through the adjusting cylinder 21 to be made incident upon the beam splitter 4 (FIG. 16).

To adjust the angular deviation of the laser beam emitted from the beam shaping prism 3 in the vertical direction, i.e. to make the optical axis of the laser beam coincidental with a predetermined optical axis on design (parallel adjustment), the screws 24 are loosened thereby releasing the adjusting cylinder 21 from the securing plate 23, so that a rotating jig 31, in the shape of a circular rod (FIG. 1), is inserted in the adjusting hole 25 of the adjusting cylinder 21 through the elongated opening 26 of the securing plate 23. The jig 31 is then rotated about the axis of the adjusting cylinder 21 by a slight angle. Consequently, the beam shaping prism 3 is rotated together with the adjusting cylinder 21. When the beam shaping prism 3 is rotated about the axis thereof for example in the clockwise direction in FIG. 3, the effective angle of the beam shaping prism 3 with respect to the laser beam incident thereon is varied so that the outgoing laser beam from the adjusting cylinder 21 is shifted in the upward direction Z by an angle $\delta$. Conversely, if the beam shaping prism 3 is rotated about the axis thereof in the counterclockwise direction in FIG. 3, the outgoing laser beam from the adjusting cylinder 21 is shifted in the reverse (downward) direction by a predetermined angle. As a result, the angle of the outgoing laser beam is varied in the vertical directions to make the direction of the beam parallel with the axes of the guide rails 15 (FIG. 16).

After the adjustment of the optical axis is completed, the screws 24 are fastened again to firmly hold the adjusting cylinder 21 by the securing plate 23.

Figure 4:
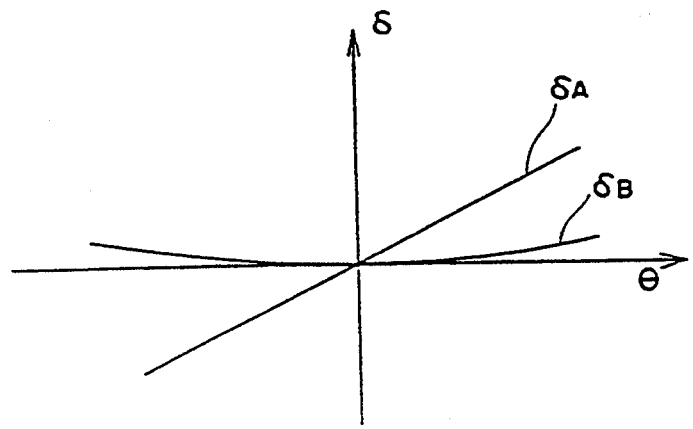
FIG. 4 is a diagram showing the relationship between rotational angles of a beam shaping prism and angular displacements of the laser beam in the adjusting apparatus shown in FIG. 1.

When the beam shaping prism 3 is rotated, the angle of the outgoing laser beam is varied in the vertical direction, as mentioned above. Note that the rotation of the beam shaping prism 3 is three dimensional, and accordingly, the change of the angle of the beam in the horizontal direction Y (FIG. 3) also takes place. However, as can be seen in FIG. 4, which shows the relationship between the angular deviations $\delta A$ and $\delta B$ of the laser beam in the vertical and horizontal directions and the rotational angle of the beam shaping prism, according to the calculation results by the inventors of the present invention, the angular deviation $\delta B$ of the laser beam in the horizontal direction is significantly smaller than the angular deviation $\delta A$ of the laser beam in the vertical 1 direction, and therefore can be neglected for a slight rotational angle of the beam shaping prism.

After the angular adjustment is completed as mentioned above, a deviation adjustment, if necessary, will be carried out as follows. The screws 24 are loosened to make the adjusting cylinder 21 free from the securing plate 23, and then, a rotating jig (tool) 32 in the form of a circular rod and having an eccentric pin 33 (FIG. 1) for the axial adjustment is inserted in the large diameter hole 28 of the support 22 so that the eccentric pin 33 is fitted in the vertical recess 27 of the adjusting cylinder 21. When the rotating jig 32 is rotated, the rotation of the eccentric pin 33 fitted in the vertical recess 27 causes the axial movement of the adjusting cylinder 21 and accordingly the beam shaping prism 3.

Figure 5:
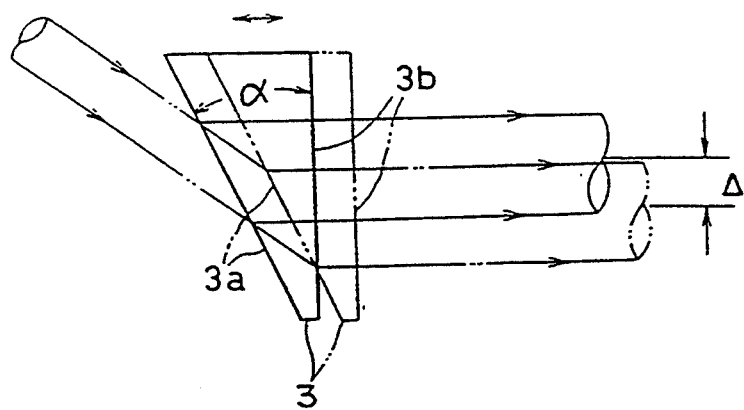
FIG. 5 is a plan view of a beam shaping prism which is moved in axial directions to adjust the deviation of the laser optical axis in the adjusting apparatus shown in FIG. 1.

Consequently, the axial movement of the beam shaping prism 3 causes the incident point of the laser beam upon the beam shaping prism 3 to change, so that there is a slight parallel translation of the outgoing laser beam by a displacement Δ in the horizontal direction, as can be seen in FIG. 5. This is the deviation adjustment.

The mechanism for rotating the beam shaping prism 3 about the optical axis thereof is not limited to the illustrated embodiment. Also, the mechanism for moving the beam shaping prism 3 in the axial direction is not limited to the illustrated embodiment and can be modified.

FIGS. 6 through 9 show a second embodiment of the present invention.

The beam shaping prism 3 is supported and secured on a circular disc-shaped support 121 and has an incident surface 3a located on the center O (FIG. 7) of the circular disc (support) 121 and an emission surface 3b.

The laser beam source 1 and the collimating lens 2 are provided on a movable substrate 122 located adjacent to the beam shaping prism 3 to constitute a light emitting portion for emitting the collimated laser beams. The movable substrate 122 is provided on a housing 123 and supports a lens barrel 124 of the collimating lens 2 secured to the upper surface thereof. The lens barrel 124 is provided on its side face with a semiconductor laser 125 which constitutes the laser source 1 located on the focal point of the collimating lens 2. The semiconductor laser 125 is mounted to a holder 126.

The movable substrate 122 has a pair of elongated holes 127 which are diagonally located, so that set screws 128 are inserted in the elongated holes 127 to secure the movable substrate 122 to the housing 123. The movable substrate 122 is provided, on the side edge adjacent to the beam shaping prism 3, with a recessed guide 129 in a generally V-shaped form having a right angle apex. The inner surfaces 129a of the V-shaped recess 129 come into contact with the cylindrical peripheral surface of the support 121. The V-shaped recess 129 is symmetrical with respect to the optical axis O of the laser source 1, so that the optical axis O of the laser beam source 1 is coincident with a bisector of the right angle corner of the triangle of the V-shaped recess 129. Namely, both of the inner surfaces 129a of the V-shaped recessed guide 129 form 45° angles with respect to the optical axis O of the laser beam source 1.

Figure 6:
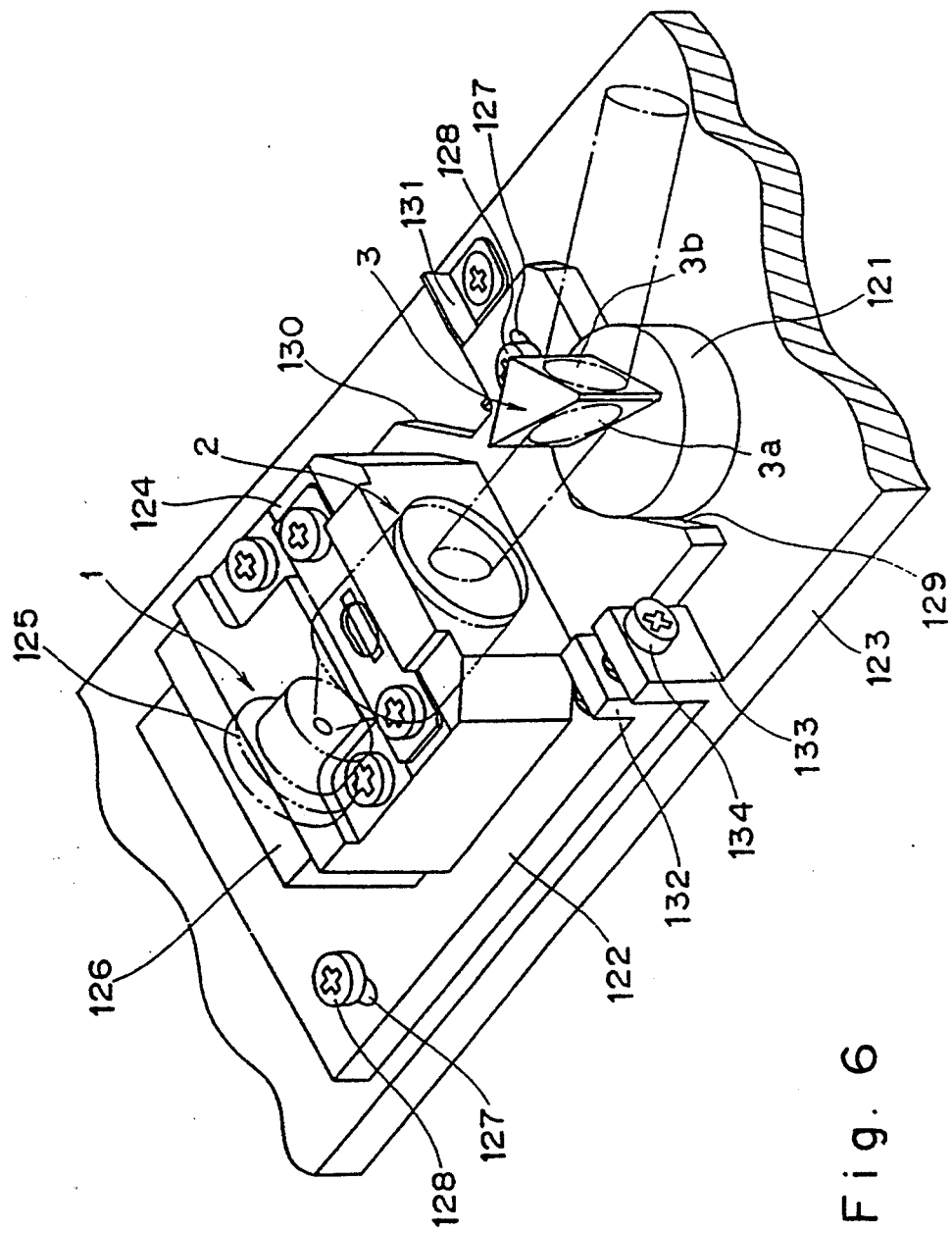
FIG. 6 is a perspective view of an optical axis adjusting apparatus according to a second embodiment of the present invention.
Figure 7:
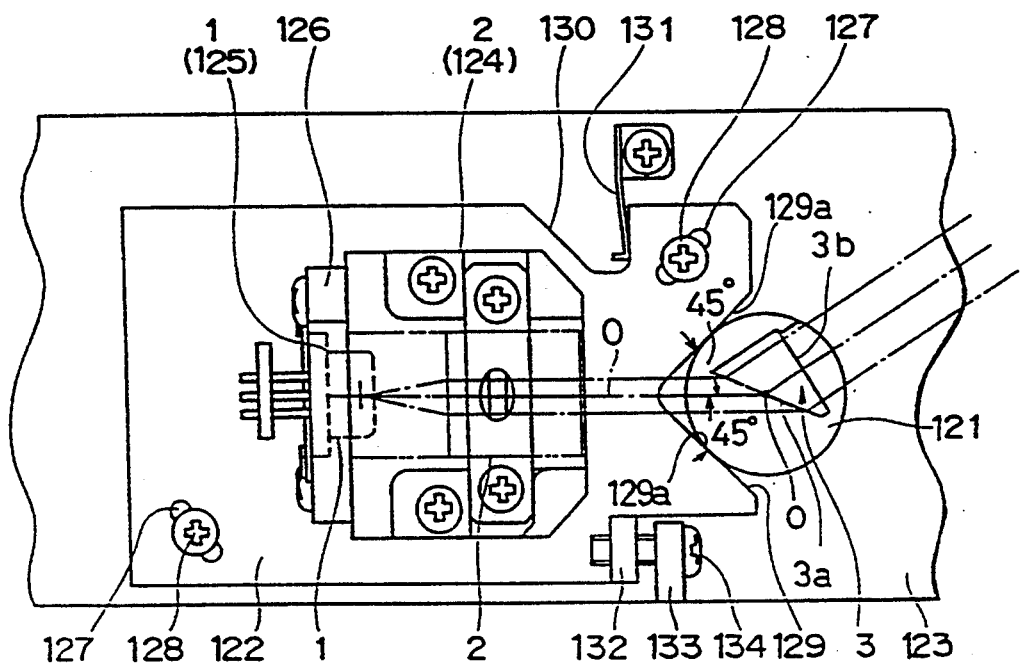
FIG. 7 is a plan view of FIG. 6.

Furthermore, the movable substrate 122 is provided on its side face with a recess 130 so that the front end of a leaf spring 131, which is mounted at its base end to the housing 123, is pressed against the inner surface of the recess 130 to bias the movable substrate 122 in the clockwise direction in FIG. 6. The substrate 122 is also provided on the other side face with a vertical projection 132. An adjusting screw 134 is inserted through the holes in the vertical projection 132 and the vertical wall 133 of the housing 123 to thereby connect the two.

In the optical disc apparatus as constructed above, in which the collimating lens 2 and the laser source 1 are integrally formed on the movable substrate 122, the light rays emitted from the laser beam source 1 are collimated by the collimating lens 2 and made incident upon the beam shaping prism 3 so that the elliptical laser beam is shaped into circular laser beam as in the first embodiment.

Figure 8:
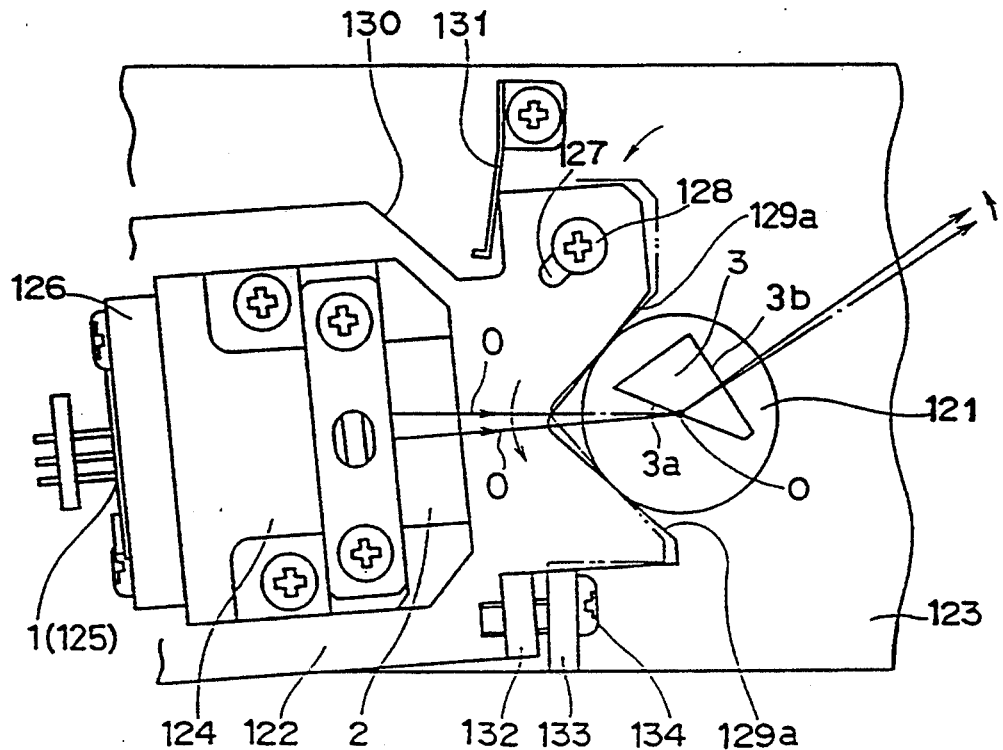
FIG. 8 is an enlarged plan view of a part of the optical axis adjusting apparatus shown in FIG. 6 to explain the rotational movement of a collimating lens and a laser beam source.
Figure 9:
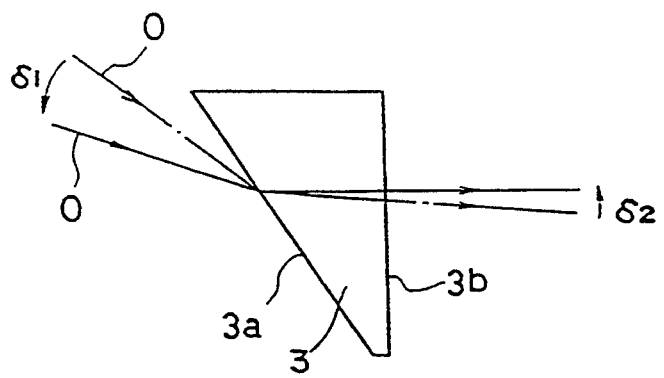
FIG. 9 is a diagram showing a relationship between rotational angles of a rotatable substrate and angular displacements of a laser beam emitted from a beam shaping prism, shown in an optical axis adjusting apparatus shown in FIG. 6.
Figure 10:
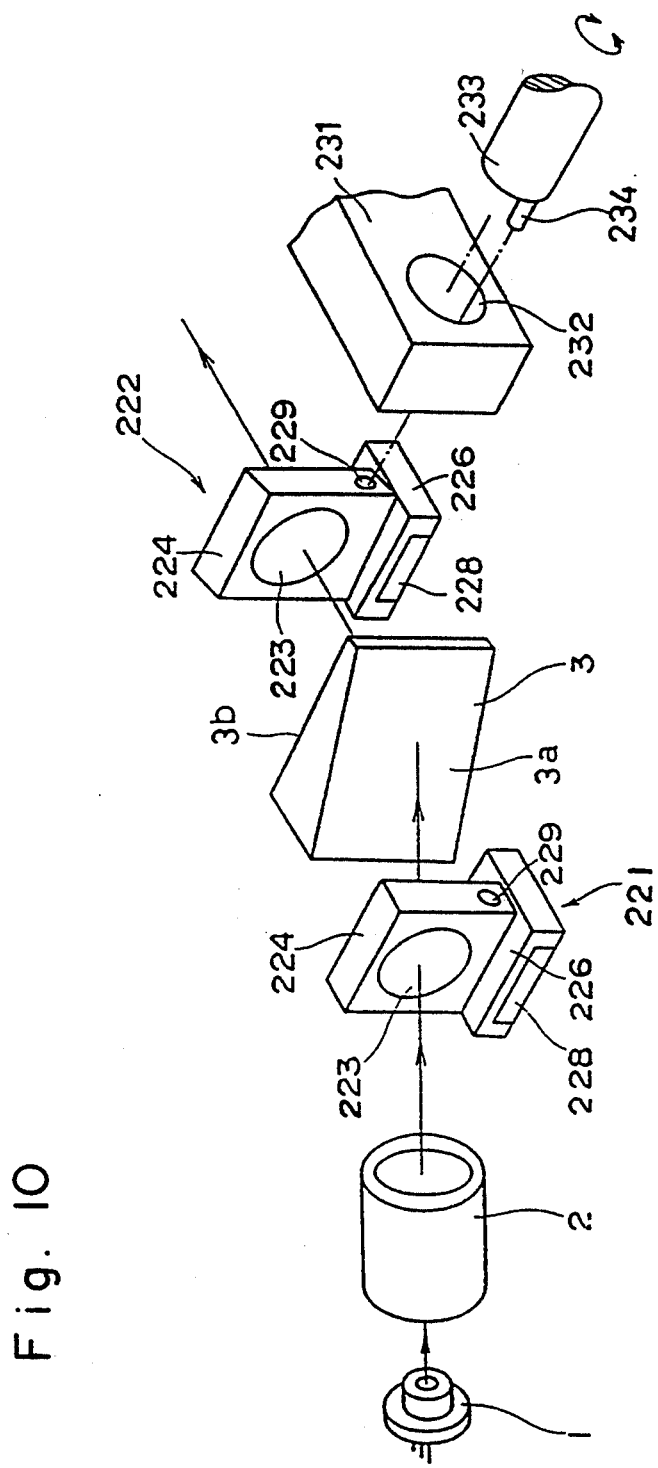
FIG. 10 is a perspective view of an optical axis adjusting apparatus according to a third embodiment of the present invention.

When the adjusting screw 134 is rotated by a screw driver or the like after the set screws 128 are loosened, the distance between the vertical projection 132 and the vertical wall 133 is varied so that the movable substrate 122 is rotated with the recessed guide 129 thereof about the peripheral surface of the cylindrical support 121. For example, when the adjusting screw 134 is rotated to decrease the distance between the vertical wall 133 and the vertical projection 132, as shown in FIG. 8, the rotated by a slight in movable substrate 122 is angle the counterclockwise direction. In this state, the leaf spring 131 biases the movable substrate 122 to press the recessed guide 129 against the peripheral surface of the support 121.

As a result, the movable substrate 122 can be rotated about the center O of the support 121. Thus, the laser beam source 1 and the collimating lens 2 can be rotated with respect to the incident surface 3a of the beam shaping prism 3.

After rotation of the movable substrate 122 is completed, the set screws 128 are fastened to firmly hold the movable substrate 122 on the housing 123 at the desired angular position.

As can be understood from the above discussion, according to the second embodiment, since the rotational adjustment of the laser beam source 1 and the collimating lens 2 with respect to the incident surface 3a of the beam shaping prism 3 causes the incident angle of the incident beams upon the beam shaping prism 3 to change, thereby changing the angle of the optical axis of the outgoing laser beam from the beam shaping prism 3, the adjustment of the angular deviation, i.e., parallel adjustment can be achieved.

It should be appreciated that the increase in the beam width by the beam shaping prism 3 means that the ratio of the angular deviation $\delta 2$ of the optical axis of the outgoing beam to the angular displacement $\delta 1$ of the optical axis of the incident beam is less than 1, and accordingly, the angular displacement of the optical axis of the outgoing beam relative to the angular variation of the movable substrate 122 can be reduced. Consequently, a fine angular adjustment can be effected.

The mechanism for rotating the laser beam source 1 and the collimating lens 2 together with respect to the incident surface of the beam shaping prism 3 is not limited to the illustrated embodiment and can be modified.

FIGS. 10 through 15 show a third embodiment of the present invention.

In the third embodiment, a first parallel shift mechanism 221 is provided on the incident side of the beam shaping prism 3, i.e., between the collimating lens 2 and the beam shaping prism 3. Similarly, a second parallel shift mechanism 222 is provided on the emission side of the beam shaping prism 3. The construction of the parallel shift mechanisms 221 and 222 are identical to each other, and accordingly, the following discussion will be directed only to the first parallel shift mechanism 221 shown in FIG. 12.

The parallel shift mechanism 221 (or 222) includes a transparent circular plate 223 having parallel end faces and a supporting frame 224 which supports the transparent plate 223. The supporting frame 224 has a cylindrical shaft portion 225 at the lower end thereof which is inserted in a circular hole 227 formed in a support (base block) 226, so that the supporting frame 224 and the transparent plate 223 can be rotated on the base block 226 in the horizontal plane.

An engaging leaf spring 228 having a bifurcated front end is inserted into a groove 226a provided on the lower end of the base block 226 so that the bifurcated end of the leaf spring 228 can be engaged in the annular peripheral groove 225a provided on the shaft portion 225 of the supporting frame 224 to prevent the supporting frame 224 from coming out of the base block 226 and also to bring the supporting frame 224 into contact with the base block 226 thereby resisting the rotation of the supporting frame 224 relative to the base block 226.

The side of the supporting frame 224 is provided with an adjusting hole 229 which is used when the rotation adjustment is effected and will be described hereinafter.

In the apparatus shown in FIGS. 10 through 15, a reference jig 231 (FIG. 10) having a circular hole 232 is supported, for example, on the side face of the second parallel shift mechanism 222, and an adjusting jig 233 in the form of a circular rod and having an eccentric pin 234 at its front end is inserted in the corresponding hole 232 of the reference jig 231 so that the eccentric pin 234 is fitted in the adjusting hole 229 of the supporting frame 224. In this state, when the adjusting jig 233 is rotated about the axis thereof, the supporting frame 224 is rotated in the horizontal plane about a vertical axis of the shaft portion 225 to adjust the angular position of the transparent plate 223 in the horizontal plane. This can also be applied to the first parallel shift mechanism 221.

Figure 11:
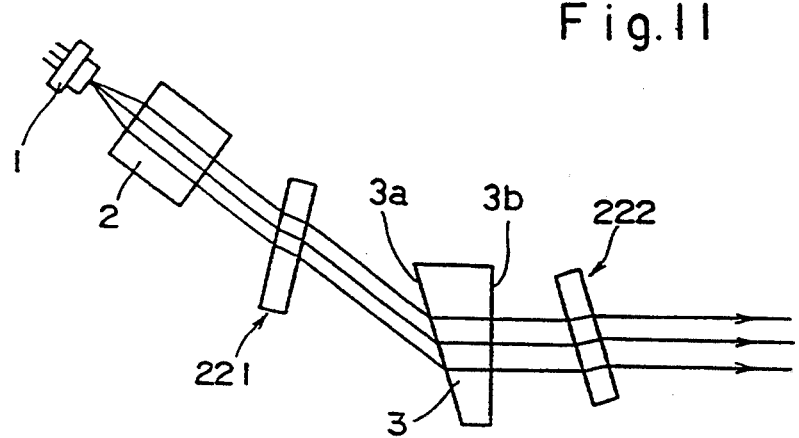
FIG. 11 is a schematic plan view of FIG. 10.
Figure 12:
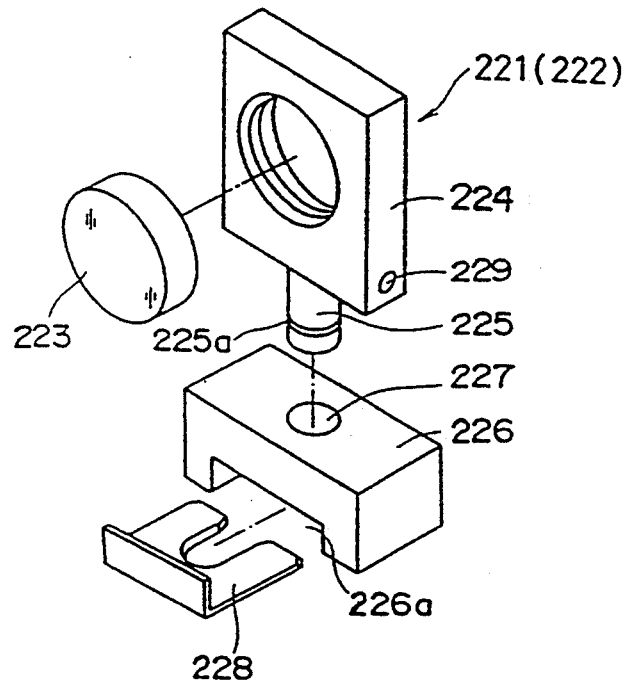
FIG. 12 is an exploded perspective view of the main elements of the optical axis adjusting apparatus shown in FIG. 11.

As can be understood from the foregoing, when the first and second parallel shift mechanisms 221 and 222 are rotated about their respective vertical axes to reorient their vertical planes with respect to the optical axis of the laser beam, the optical axis of the laser beam is shifted in parallel in the horizontal directions by the first and second parallel shift mechanisms 221 and 222 to adjust the deviation thereof, respectively, as can be seen in FIG. 11.

Figure 13:
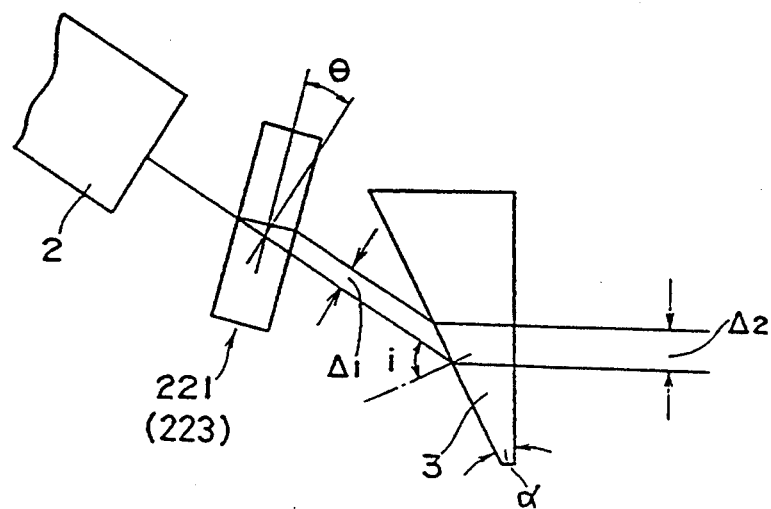
FIG. 13 is a schematic plan view of a first parallel shift mechanism in an optical axis adjusting apparatus shown in FIG. 11.

In the first parallel shift mechanism 221, looking at the light rays of the laser beam which are shifted in parallel by a displacement $\Delta 1$ when the transparent parallel plate 223 is rotated by an angle $\theta$, as shown in FIG. 13, the anamorphic ratio $\gamma$ is given by the following equation:

$$\gamma = \cos(i)/\cos(\alpha)$$

where "$\alpha$" designates the apex angle of the beam shaping prism 3, and "$i$" designates the incident angle of the laser beam upon the beam shaping prism, respectively.

The laser beam is enlarged $\gamma$ times in the horizontal direction by the beam shaping prism 3, and accordingly, the amount of parallel shift of the laser beam is increased to be $\Delta 2$. As a result, the parallel shift relative to the angular displacement of the first parallel shift mechanism 221 is increased, so that a coarse adjustment can be effected in a wide range.

For example, with $\gamma = 2.00$, $\Delta 2 = \gamma \cdot \Delta 1 = 2 \Delta 1$. Namely, $\Delta 2$ is two times $\Delta 1$.

Figure 14:
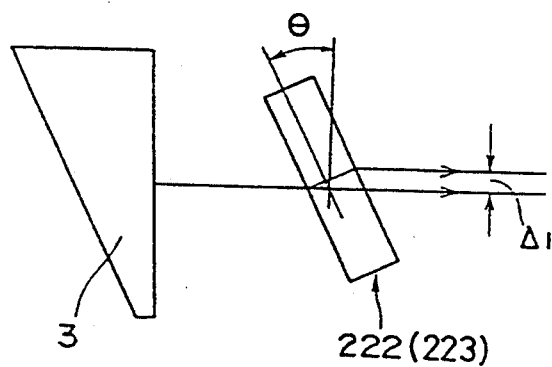
FIG. 14 is a schematic plan view of a second parallel shift mechanism in an optical axis adjusting apparatus shown in FIG. 11.

On the other hand, in the second parallel shift mechanism 222, the outgoing light rays of the laser beam from the beam shaping prism 3 is shifted in parallel by a parallel refraction. However, expansion of the laser beam in the horizontal direction does not occur thereafter, as shown in FIG. 14, and the parallel shift is identical to $\Delta 1$ which is obtained when the transparent parallel plate 223 is rotated by an angle $\theta$. Thus, a fine adjustment can be effected.

Consequently, it is possible to make a fine adjustment of the deviation in a wide range by adjusting one or both of the first and second parallel shift mechanisms 221 and 222.

It is also possible to provide only one of the first and second parallel shift mechanisms, depending on the requirements of assembly precision of the optical disc apparatus.

Figure 15A:
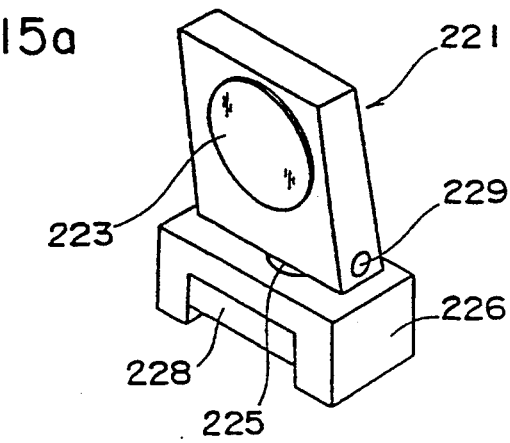
FIG. 15a is a perspective view of an optical axis adjusting apparatus according to a fourth embodiment of the present invention.
Figure 15B:
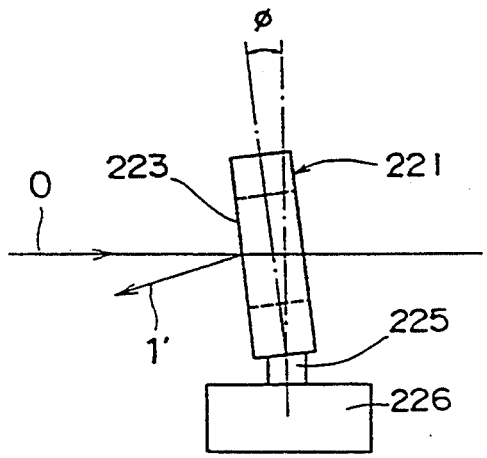

Further, it is possible to slightly vary the vertical orientation of the parallel plate 223 by an angle $\phi$ with respect to a direction (vertical plane) perpendicular to the optical axis of the laser beam, as shown in FIGS. 15a and 15b in which the first parallel shift mechanism 221 is illustrated by way of example. In this arrangement, even when the transparent parallel plate 223 is rotated to a position in which it lies in a vertical plane normal to the optical axis of the laser beam, the laser beam 1' reflected by the parallel plate 223 is oriented in a direction deviated from the optical axis 0, and accordingly, light is not returned to the laser beam source. This results in a stable laser oscillation of the laser beam source and no noise.

Although the above discussion has been directed to the embodiments in which the beam shaping is carried out by a prism, the invention can be applied to an alternative arrangement in which the beam shaping prism is replaced with an optical element other than a prism. Furthermore, the transparent plates having the parallel end faces in the parallel shift mechanisms can be replaced with other optical elements.

We claim:

1. An optical axis adjusting apparatus for adjusting the optical axis of a laser beam, said apparatus comprising: a beam shaping prism having an incident surface and an emission surface which together define a predetermined apex angle; and a parallel shift mechanism which is provided on at least one of the incident an emission sides of the beam shaping prism for shifting the light rays of the laser beam, wherein said parallel shift mechanism comprises at least two adjustable plates through which said laser beam is adapted to be transmitted, a first one of said plates being positioned on the incident side of said beam shaping prism, and a second one of said plates being positioned on the emission side of said beam shaping prism.

2. An optical axis adjusting apparatus according to claim 1, wherein said at least two adjustable plates each comprise a transparent parallel plate through which the laser beam is transmitted, and a rotation adjusting means for rotatably adjusting each parallel plate about an axis which is normal to an optical axis of said laser beam.

3. An optical axis adjusting apparatus according to claim 2, wherein each of said transparent parallel plates is adapted to be selectively fixed at a predetermined angle with respect to a plane which is perpendicular to said optical axis of said laser beam.

4. An optical axis adjusting apparatus according to claim 1, wherein said laser beam is obliquely incident upon said incident surface of said beam shaping prism.

5. An optical axis adjusting apparatus in accordance with claim 1, wherein each of said plates is rotatably and adjustably positioned on a support.

6. An optical axis adjusting apparatus in accordance with claim 5, wherein each of said plates comprises a transparent, generally circular plate.

7. An optical axis adjusting apparatus for adjusting the optical axis of a laser beam emitted by a laser beam source, said apparatus comprising:

(a) a beam shaping prism having an incident surface and an emission surface which together define a predetermined apex angle; and (b) two rotatably supported generally transparent plates, a first generally transparent plate being positioned on said incident side of said beam shaping prism, and a second generally transparent plate being positioned on said emission side of said beam shaping prism, for adjustably positioning said laser beam emitted by said laser beam source, whereby adjustment of said first generally transparent plate allows coarse adjustment of said laser beam, and adjustment of said second generally transparent plate allows fine adjustment of said laser beam.

8. An optical axis adjusting apparatus in accordance with claim 7, wherein each of said first and second plates is a transparent parallel plate which is rotatably positioned on a support.

9. An optical axis adjusting apparatus in accordance with claim 8, further comprising a biasing means positioned within a recess in said support for retaining a supporting frame which holds said plate within a block, and for opposing rotation of said supporting frame within said block.

10. An optical axis adjusting apparatus in accordance with claim 8, wherein each of said transparent parallel plates is positioned within a frame rotatably mounted on said support, each said frame incorporating at least one adjusting aperture.

11. An optical axis adjusting apparatus in accordance with claim 10, wherein said aperture comprises means for receiving an eccentric pin positioned at one end of an adjusting jig which is adapted to adjustably position said plate and said frame with respect to said support.

* * * * *

UNITED STATES PATENT AND TRADEMARK OFFICE
CERTIFICATE OF CORRECTION

PATENT NO. :
DATED      :    5,341,246
INVENTOR(S) :   August 23, 1994
                Masahiro OONO et al.

It is certified that error appears in the above-indentified patent and that said Letters Patent is hereby corrected as shown below:

At column 8, line 49 (claim 1, line 6), change "an" to -- -and---.

Signed and Sealed this

Twenty-first Day of March, 1995

Attest:

BRUCE LEHMAN

*Attesting Officer*    *Commissioner of Patents and Trademarks*